es Patent [19]

Regan

[11] 4,296,328
[45] Oct. 20, 1981

Best Available Copy

[54] APPARATUS FOR PRODUCING HIGH PURITY WATER

[76] Inventor: Michael D. Regan, 40 Maple St., Medway, Mass. 02053

[21] Appl. No.: 120,725

[22] Filed: Feb. 11, 1980

[51] Int. Cl.³ ............................................. G01N 21/00
[52] U.S. Cl. ................................. 250/436; 250/432 R
[58] Field of Search .................... 250/428, 432 R, 435, 250/436, 437, 455

[56] References Cited

U.S. PATENT DOCUMENTS

| | | | |
|---|---|---|---|
| 2,340,890 | 2/1944 | Lang et al. | 250/436 |
| 2,669,661 | 2/1954 | Riddiford et al. | 250/436 |
| 3,731,090 | 5/1973 | Veloz . | |
| 3,923,663 | 12/1975 | Reid . | |
| 3,948,772 | 4/1976 | Ellner . | |
| 4,141,686 | 2/1979 | Lewis | 250/436 |
| 4,141,830 | 2/1979 | Last . | |

*Primary Examiner*—Bruce C. Anderson
*Attorney, Agent, or Firm*—Walter J. Kreske

[57] ABSTRACT

Apparatus and method for producing and maintaining high purity water of a quality suitable for delicate laboratory analysis work. The apparatus is comprised of a cylindrical stainless steel two gallon container for holding a batch of distilled water, a removable cover forming a closure on the container and carrying close to the wall of the container a closed bottom transparent quartz tube extending substantially to the bottom of the container and housing therein an elongated mercury vapor lamp substantially the height of and parallel to the wall of the container and electrically coupled to a starter, ballast and On-Off switch circuits in a housing fixed to the top of the cover and adapted for coupling to an alternating current power source for thereby causing the mercury vapor lamp to become a source of photochemically active 185 nanometer wavelength range electromagnetic radiation in the batch of water in the container and causing a gentle steady state convection circulation of the water about the source of the electromagnetic radiation which results in the photochemical oxidation of any organic matter in the water and maintains the water in a state of high purity.

8 Claims, 5 Drawing Figures

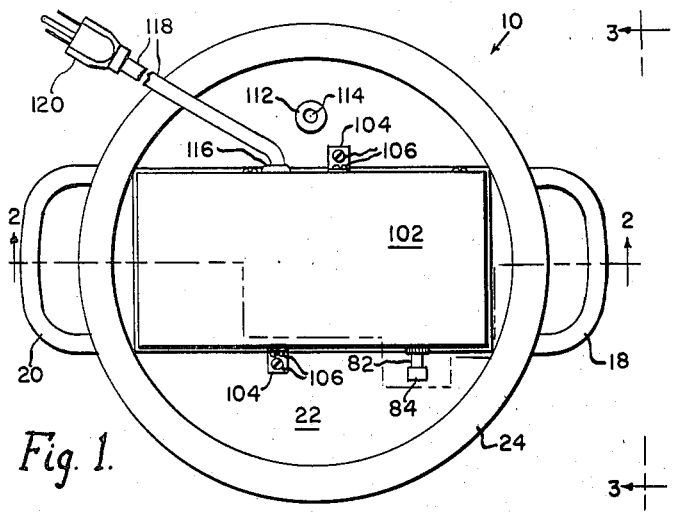
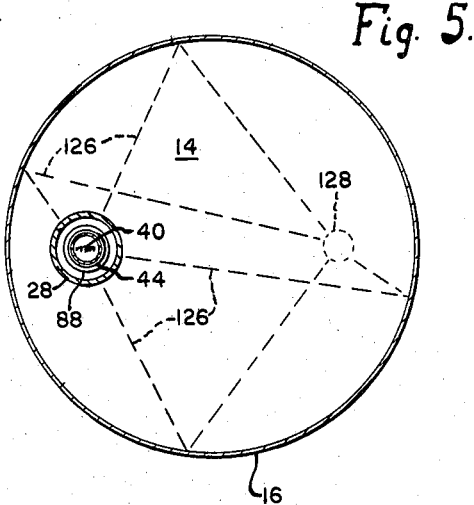
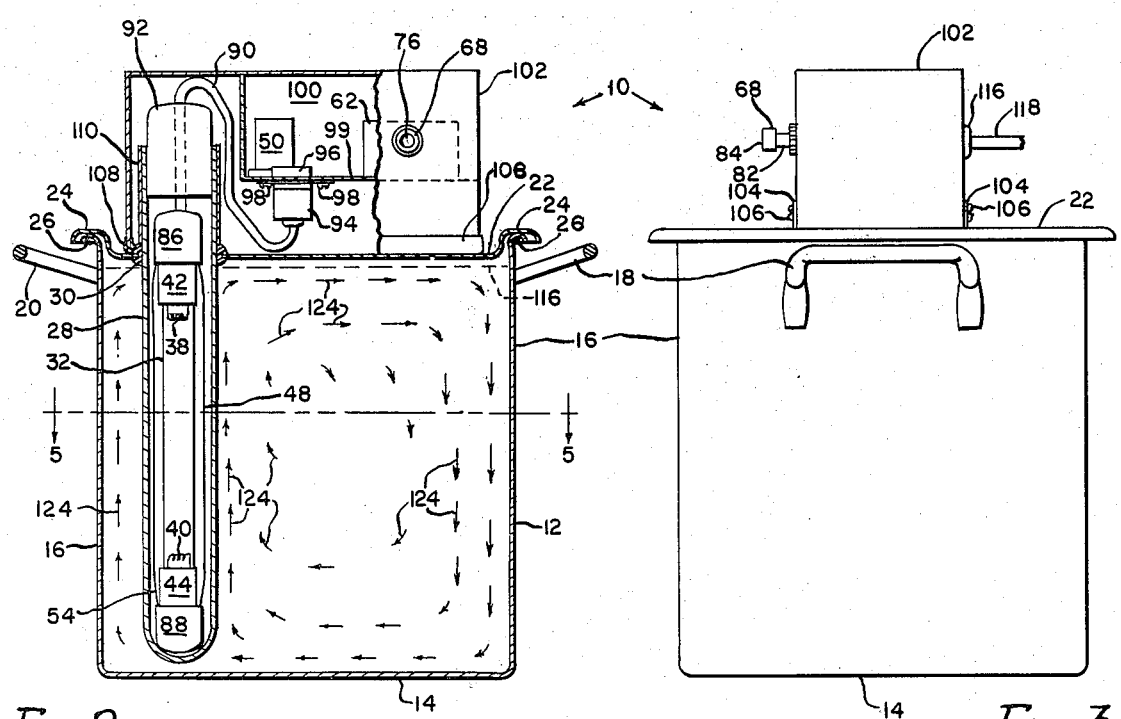
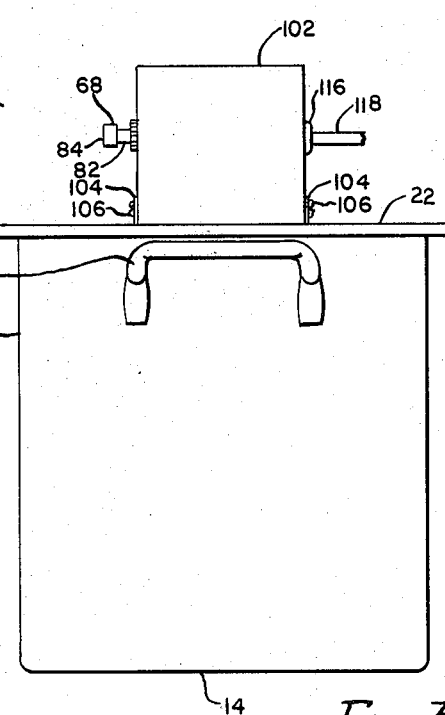
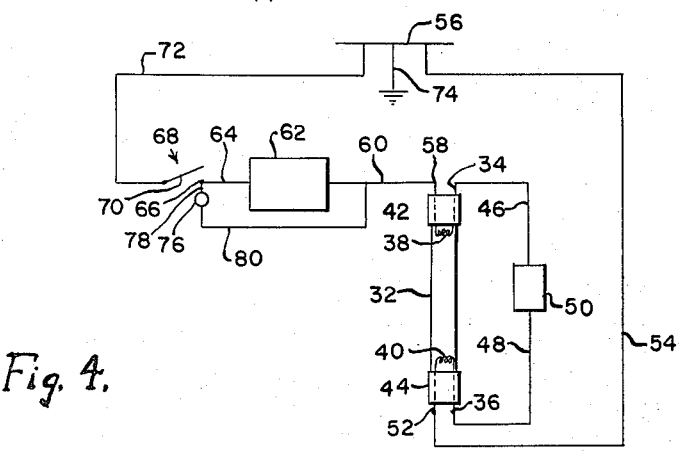
Fig. 1.
Fig. 5.
Fig. 2.
Fig. 3.
Fig. 4.

APPARATUS FOR PRODUCING HIGH PURITY WATER

BACKGROUND OF THE INVENTION (1) Field of the Invention

An apparatus and method for producing and maintaining a batch of high purity water of a quality suitable for delicate laboratory analysis work by electromagnetic radiation in the 185 nanometer wavelength range.

(2) Description of the Prior Art

Refinements in chemical analysis such as in chromatography have resulted in improved techniques which make possible identification of trace components in test samples to as small as a few parts per billion. Such refinements make even traces of organic materials in distilled water used in such analyses undesirable and a possible cause for distortion of analytic results. Analytical distortions may also be caused by variations in temperature, or the presence of air bubbles in the water used in the tests.

To meet this need for high quality water, specially prepared distilled water in carefully sealed containers has become commercially available at prices much higher than that of conventionally prepared distilled water. However, because the laboratory need at any given time is for only a small fraction of the distilled water in the sealed container, the contents after such first fractional use has a very short life for analytical purposes because of organic build-up in the remaining contents.

SUMMARY OF THE INVENTION

These problems have been overcome by the present invention of an apparatus and method which removes existing organic matter and prevents organic build-up in the water, thereby making practical the use of much less expensive conventionally prepared distilled water as well as preserving for future use the remaining contents of specially prepared expensive distilled water after the sealed container has been opened. Another advantage of the present invention is the provision of an apparatus and method which maintains a desirably uniform test water temperature and thereby prevents analytical distortions caused by water temperature variations. And a further advantage is the provision of an apparatus and method which produces bubble free water and thereby prevents possible analytical distortions in test results caused by the presence of bubbles in test samples.

A primary object of the present invention is the provision of an apparatus and method for the photochemical removal of organic material from a batch of water for producing and maintaining the water of a quality suitable for delicate laboratory analytic work such as in chromatography.

Another object is the provision of an apparatus and method for photochemically preventing organic build-up in a batch of water.

And another object is the provision of an apparatus and method for the photochemical removal of organic material from water without the introduction of bubbles and for maintaining the water in this condition at a steady state temperature for substantially any desired period of time.

Further objects include the provision of an apparatus and method for photochemically removing organic material from water which is relatively inexpensive to build, easy and inexpensive to operate and which is hand portable to substantially any desired location and is particularly convenient for laboratory use in chromatography.

These objects, features and advantages are achieved generally by the provision of a container forming a reservoir for holding a batch of the water and providing means for producing electromagnetic radiation in the 185 nanometer range in the batch of water in the container and positioned to effect a gentle convection steady state circulation of the water about the source of radiation.

By positioning the source of radiation at one extremity of the container, gentle convection circulation in the batch of water about the source of radiation is enhanced.

By making the container with a cylindrical wall with the source of radiation in the form of an elongated gaseous discharge tube substantially parallel close to the cylindrical wall to cause reflections from the wall to form a substantial image of the source at a distance from the discharge tube in the batch of water, increased rate of photochemical oxidation of organic material in the batch of water is thereby achieved.

By using a mercury vapor lamp as the gaseous discharge tube, a desirably economical commercially available component for use in the present invention is thereby achieved.

By making the container with about a two gallon capacity and a height about equal to the length of the gaseous discharge tube, a hand portable structure which is particularly suitable for use in chromatography laboratory test work is thereby achieved.

By providing the container with a removable cover carrying a quartz glass tube housing the gaseous discharge tube, ready access to the interior of the container for filling, cleaning and servicing is thereby achieved.

By providing a housing fixed to the top of the cover and carrying therein a starter, ballast, electrical ON-OFF switch and associated electrical circuits operatively coupled to the gaseous discharge tube, a convenient unitary arrangement which is manually transportable to substantially any desired place of use is thereby achieved.

By using distilled water as the batch of water in the container and subjecting it to the 185 nanometer radiation for an effective period of time, a purity of the water free of bubbles and at a steady state temperature particularly suitable for delicate chromatography test work is achieved and maintained for substantially any desired length of time.

These features, objects and advantages will be better understood from the following description taken in connection with the accompanying drawings of a preferred embodiment of the invention.

BRIEF DESCRIPTION OF THE DRAWINGS

FIG. 1 is a plan view of an apparatus in accordance with present invention for photochemically removing organic material from a batch of water.

FIG. 2 is a cross sectional view of the FIG. 1 embodiment taken on line 2—2 of FIG. 1.

FIG. 3 is a side view of the FIG. 1 embodiment taken in the direction of the arrows at line 3—3.

FIG. 4 is a diagramatic representation of the electric circuit in the FIG. 1 embodiment to more clearly show construction and operation of the FIG. 1 embodiment.

FIG. 5 is a cross sectional view taken on line 5—5 of FIG. 2 to more clearly show construction and operation of the FIG. 1 embodiment.

DETAILED DESCRIPTION OF THE PREFERRED EMBODIMENT

Apparatus in accordance with the present invention for removing organic material from a batch of water and thereafter preventing organic build-up in the water is designated generally by the numeral 10. The apparatus 10 has a stainless steel two gallon container 12 having a flat bottom 14 and cylindrical side wall 16, fastened to the upper portion of which are handles 18 and 20 for facilitating manual portability of the apparatus 10. A stainless steel cover 22 having an inverted channel 24 about its periphery engages the rim 26 at the top of the cylindrical wall 16 to form for the container 12 a closure which is removable by lifting upwardly and which is restrained from lateral movement by the sidewalls of the channel 24 overlapping the rim 26.

The cover 22 carries a closed bottom tube 28 made of a material such as quartz which is highly transparent to electromagnetic radiation in the 185 nanometer wavelength range. The tube 28 is located at one side of the center of the container 12, parallel and close to the cylindrical wall 16 and extends to the bottom 14 of the container 12 for purposes to be hereinafter further described. The tube 28 is held in place in an opening in the cover 22 by a grommet 30 preferably of a plastic material such as silicon rubber.

The tube 28 carries therein an elongated gaseous discharge tube 32 such as an ultraviolet mercury vapor lamp having capacity for emitting electromagnetic radiation in the 185 nanometer wavelength range. The mercury vapor lamp 32 has terminals 34 and 36 (FIG. 4) extending from one end of each of the respective lamp ignition elements 38 and 40 and protruding through the respective dielectric material caps 42 and 44 and coupled by insulation covered electric wire current conductors 46 and 48 across a conventional gaseous discharge tube starter 50. The other terminal 52 from the ignition element 40 is coupled by insulation covered electric wire current conductor 54 to a conventional alternating current power source 56 such as that available by plugging into a wall receptacle carrying 120 volt 60 hertz alternating current. The other terminal 58 from the ignition element 38 is coupled by insulation covered electric current wire conductor 60 to one side of a choke or ballast 62, the other side of which is coupled by an insulation covered electric wire current conductor 64 to one terminal 66 of an electric push button type switch 68. The contact arm 70 of the switch 68 is coupled by an insulation covered electric wire current conductor 72 to the other side of the alternating current power source 56. An electric current conductor ground wire 74 grounded on the housing 102 is also provided for operation safety.

A miniature light bulb 76 is electrically coupled in parallel with the ballast 62 by insulation covered electric wire conductors 78 and 80 to electric wires 64 and 60 respectively. The miniature electric light bulb 76 is placed at a location with respect to hollow stem 82 and a transparent plastic push button 84 at the end of the hollow stem 82 to make light emitted from the miniature light bulb 76 visible at the transparent push button 84.

Flexible plastic covers 86 and 88 are placed over the respective dielectric material caps 42 and 44 to center and cushion the mercury vapor lamp 32 in the tube 28. The cover 86 has a hole centrally thereof for carrying the electric wires 48, 54, 46 and 60 in a single dielectric sheath 90 which passes through a hole in a flexible plastic closure member 92 in the upper end of the tube 28 to respective terminals of a conventional four terminal electric plug 94 which is plugged into an associated electrical receptacle 96 fastened by screws 98 to the bottom wall 99 of a metal walled compartment 100 housing the starter 50, ballast 62 and switch 68 which are electrically coupled through the receptacle 96 to effect the circuit arrangement shown in FIG. 4. The compartment 100 is part of the housing 102 fixed to the top of the cover 22 by brackets 104 and screws 106.

A weatherstrip 108 of flexible material such as silicone rubber 102 provides a weathertight seal against the top of the cover 22. The upper portion of the tube 28 has its periphery covered with a material 110 which is opaque to electromagnetic radiation from the mercury vapor lamp 32 and together with closure member 92 confines radiation from the lamp 32 to the interior of the container 12 below the cover 22.

A silicon rubber grommet 112 in an opening through the cover 22 provides an opening 114 to the interior of the container 12 for venting carbon dioxide from photochemical oxidation of organic material by radiant energy from the lamp 32 and to provide access for removing laboratory test quantities of the purified water from the container 12 by a siphon tube or other suitable means (not shown).

The electric wire conductors 54, 72 and 74 emerge from the housing 102 through a protective grommet 116 in a hole in the side of the housing 102 as a single envelope three electric wire cable 118 terminating in a conventional three pronged electric plug 120 for insertion in the power source receptacle 56.

In the operation of the apparatus 10, the cover 22 with its housing 102 and components carried therein may be manually lifted away and the container 12 filled preferably with distilled water to a level such that when the cover 22 is again replaced on the container 12 the water level will be at about that shown by the broken line 122 which is well above the ignition element 38 and the transparent part of the elongated gaseous discharge tube 32. The electric plug 120 is inserted into a suitable 120 volt, 60 hertz alternating current power source receptacle 56 and the switch 68 closed by depressing the push button 84. Thereupon the miniature light 76 will go on and its light will be visible at the transparent push button 84 as an indication of the apparatus 10 being in operation. Also, the starter 50 will cause current to flow through the ignition elements 38 and 40 making them incondescent and thereby igniting the mercury vapor lamp 32 under the control of the ballast 62 and to emit ultraviolet radiation and in particular radiation in the 185 nanometer wave length range. The accompanying heat from the lamp 32 causes a gentle convection water circulation in the container 12 in general direction shown by the arrows 124 (FIG. 2). Thus the water circulates close to the transparent quartz tube 28 where it receives a relatively high intensity dose of the radiation from the lamp 32 and particularly the 185 nanometer wavelength radiation causing photochemical oxidation of such organic material as may be in the water. The placement of the lamp 32 parallel to the wall 16 to one side of the center of the container 12 and at a position such that radiation from the lamp 32 is reflected, as indicated by broken lines 126 (FIG. 5), from the inside surface of the wall 16 and tends to converge as a substantial image of the source 32 at a position 128 adjacent the wall 16 at the opposite side of the center of the container 12 and thereby provides added assistance in the photochemical oxidation of organic matter.

It has been found that by leaving the water in the container 12 overnight a sufficiently pure water in container 12 is assured and at a steady state condition of temperature of the water for assuring its suitability for delicate laboratory analytical test use such as in chromatography. For this purpose, test quantities of the water may be removed with a siphon tube or other suitable instrument (not shown) through the opening 114 in the grommet 112. Also, since the two gallons of water in the container 12 is more than adequate for a customary day's laboratory needs, there is usually sufficient water left for suitably cleaning laboratory test instruments at the end of the day before refilling the container 12 for its operation over night in preparation of the next day's supply. Water which has been purified in this overnight manner may continue to be maintained in this steady state condition for substantially any length of time desired.

The lamp 32 being completely below the level 116 of the water in the container 12 and extending to substantially the bottom 14 of the container 12 provides maximum exposure of radiation directly to the water in the container 12 and thereby minimizing generation of ozone. Also, ozone generated within the tube 28 is confined in the tube 28 by the closure member 92 and the opaque barrier 110 about the upper part of the tube 28.

What is claimed is:

1. An apparatus for photochemically removing organic material from water comprising a container forming a non-continuously inflowing and outflowing type single chamber water reservoir for holding a batch of said water in said single chamber reservoir, means for producing electromagnetic radiation in the 185 nanometer wavelength range including a source of said radiation positioned in said container to effect a gentle steady state circulation of the water in said batch about said source of radiation, and means for venting to the atmosphere from said container gasses produced in said container by said radiation.

2. An apparatus as in claim 1 wherein said source of electromagnetic radiation is disposed adjacent one extremity of said reservoir.

3. An apparatus as in claim 1 wherein said container has a cylindrical wall and a substantially flat bottom and said source of said electromagnetic radiation comprises an elongated gaseous discharge tube extending close to said bottom and disposed substantially parallel and adjacent to said wall.

4. An apparatus as in claim 3 wherein the elongated discharge tube is sufficiently close to said wall to cause radiation reflections from said wall to form a substantial image of said source of radiation in said batch of water in said container displaced a distance from said discharge tube.

5. An apparatus as in claim 4 wherein said container has a two gallon water capacity and is of a height about equal to the length of said discharge tube.

6. An apparatus as in claim 4 wherein said gaseous discharge tube is a mercury vapor lamp and said container has a removable cover, a quartz glass tube fixed to said cover and extending into said container, and said mercury vapor lamp is in said quartz glass tube.

7. An apparatus as in claim 6 having additionally a housing fixed to the top of said cover and in said housing a mercury discharge lamp starter, ballast, electrical ON-OFF switch and associated electric circuit means adapted for operatively coupling said mercury vapor lamp, starter, ballast and ON-OFF switch to an alternating current power source.

8. An apparatus as in claim 7 wherein said quartz glass tube has a radiation shield and closure member positioned for confining said electromagnetic radiation to the batch of water inside said container.

* * * * *